July 7, 1970 GERHARD-GÜNTER GASSMANN 3,519,943

FREQUENCY DISCRIMINATOR FOR PULSE-SHAPED SIGNALS UTILIZING SEMICONDUCTOR STORAGE TIME

Filed March 20, 1968 3 Sheets-Sheet 1

INVENTOR

GERHARD-GÜNTER GASSMANN

BY Philip M. Bolton

ATTORNEY

INVENTOR
GERHARD-GÜNTER GASSMANN
BY Philip M. Bolton
ATTORNEY

INVENTOR
GERHARD-GÜNTER GASSMANN

BY Philip M. Bolton
ATTORNEY

United States Patent Office 3,519,943

Patented July 7, 1970

3,519,943

FREQUENCY DISCRIMINATOR FOR PULSE-SHAPED SIGNALS UTILIZING SEMICONDUCTOR STORAGE TIME

Gerhard-Gunter Gassmann, Berkheim, Germany, assignor to International Standard Electric Corporation, New York, N.Y., a corporation of Delaware Filed Mar. 20, 1968, Ser. No. 714,498

Claims priority, application Germany, Mar. 22, 1967, St 26,674

Int. Cl. H03d *1/18;* H03k *19/08*

U.S. Cl. 329—102 5 Claims

ABSTRACT OF THE DISCLOSURE

A frequency discriminator for pulse-shaped signals which utilizes the storage time delay effects of semiconductor instead of the conventionally used tuned circuit.

A first embodiment includes a first diode, with the output voltage thereof consisting of pulses whose amplitude, within the operating range of the discriminator, being in proportion to the difference of time between the trailing edge and the leading edge of the pulses of the applied train of pulses, less the diode storage time. The diode detector converts the pulses into a DC output voltage whose magnitude being in proportion to the amplitude of the pulses. A second embodiment uses transistors instead of diodes. In addition thereto, the DC output voltage is fed back to the first transistor to control the center frequency of the discriminator.

BACKGROUND OF INVENTION

Field of invention

The invention relates generally to a frequency discriminator or detector for pulse-shaped signals and particularly one with a steep output-versus-frequency characteristic curve in its operating range.

Description of the prior art

There exist frequency discriminators which process pulse-shaped signal which do not use tank circuits. These discriminators utilize the pulse counting principle and have an output voltage which is directly proportional to the applied frequency. The discriminator characteristic curve of these discriminators is an inclined straight line passing through zero ($f=0$). However, these discriminators exhibit a small change in output voltage per unit change in frequency. As a consequence thereof the degree of efficiency of such a discriminator is low for signals having a low ratio of $\Delta f/f$.

SUMMARY OF INVENTION

It is the object of the present invention to provide a discriminator which possesses a steep discriminator characteristic curve relative to the center frequency, requires no tank circuit, and can be manufactured by integrated circuit technique.

According to the invention a pulse wave is applied to a semiconductor element, the voltages of said wave alternating between a turn-on and a cut-off level for said element. This element produces a pulse-shaped output voltage whose amplitude, within the operating range of the discriminator, being in proportion to the difference of time between the trailing edge and the leading edge of the input pulses reduced by the storage time of this element.

Figure 1:
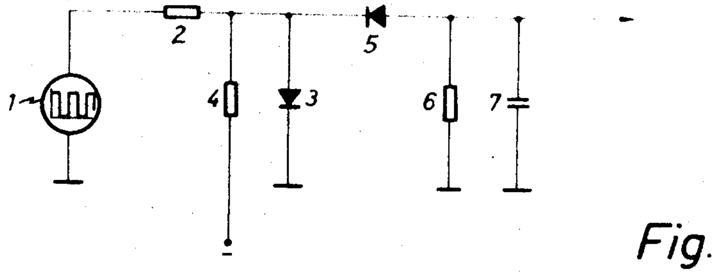
Figure 2A:
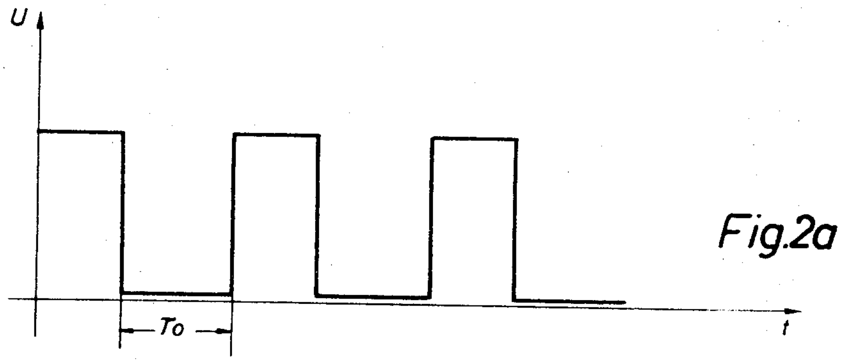
Figure 2B:
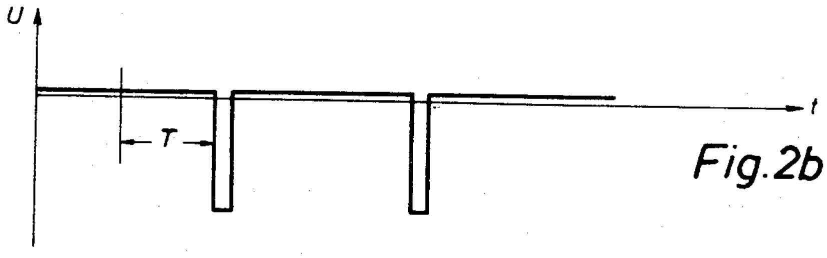

The above mentioned and other objects of this invention will become apparent by reference to the following description in conjunction with the accompanying drawings in which:

FIG. 1 is a schematic diagram of a frequency discriminator according to the invention, FIG. 2*a* is an idealized waveform of an assumed input signal, FIG. 2*b* is an idealized waveform which appears across diode 3 in FIG. 1 when the input signal is as shown in FIG. 2*a,*

Figure 2C:
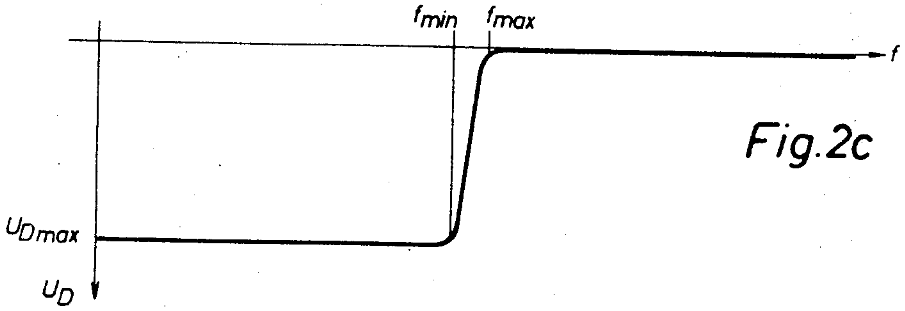
Figure 3:
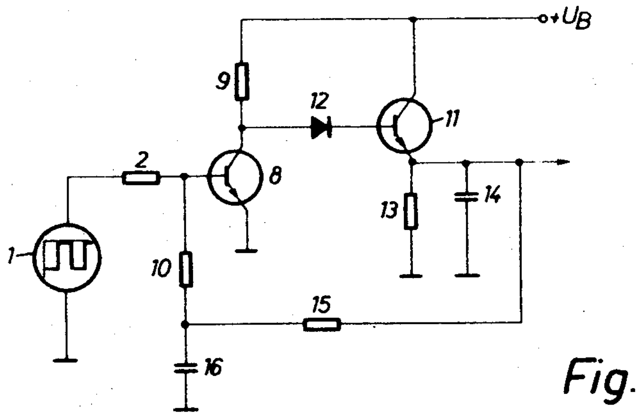
Figure 4A:
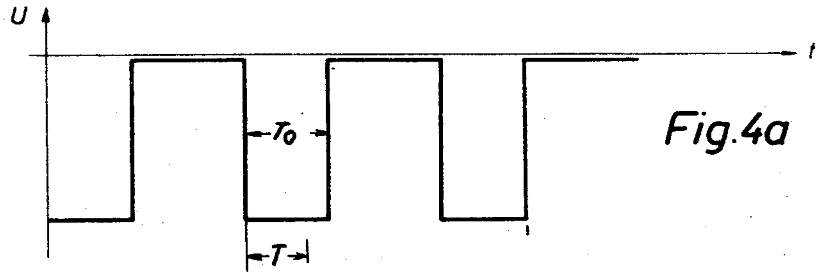

FIG. 2*c* is a representation of the discriminator characteristic curve of the circuit shown in FIG. 1, FIG. 3 is a schematic diagram of a transistorized frequency discriminator according to the invention, FIG. 4*a* is an idealized waveform of an assumed input signal for the circuit of FIG. 3.

Figure 4B:
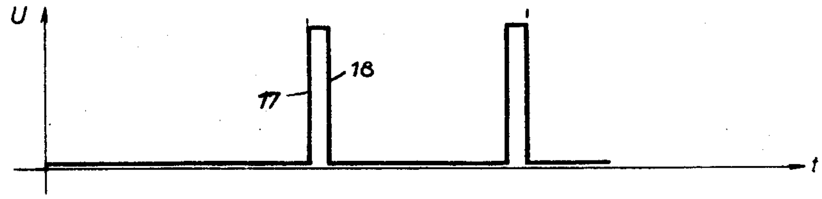
Figure 6:
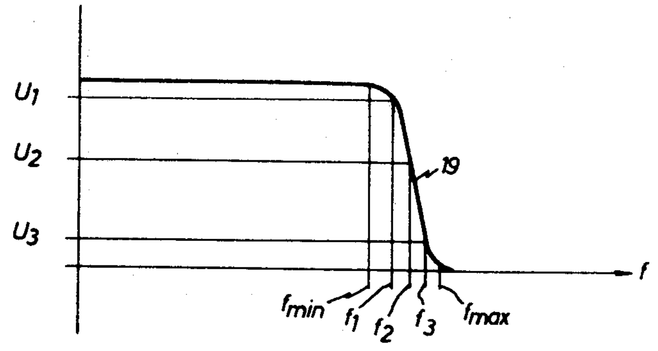

FIG. 4*b* shows the idealized waveform which appears at the collector of transistor 8 in FIG. 3, FIG.S 5*a* through 5*c* show illustrative waveforms which appear at the collector of transistor 8 when input signals of different frequencies are applied, FIG. 6 represents the characteristic curve of the discriminator illustrated in FIG. 3.

FIG. 1 illustrates an example of the arrangement according to the invention. In this example, 1 represents a signal source which provides a pulse signal as illustrated in FIG. 2*a*. This signal source is in series with a resistor 2 and is applied to a diode 3, which is biased by resistor 4 connected to a negative supply. When the leading edge of a pulse is applied to diode 3, it conducts. When the trailing edge transition of the input signal pulse occurs, the source voltage drops to approximately zero and the current that then flows in the diode 3 is due to the storage time effect. The storage time effect and the negative voltage as applied to the resistor 4 cause the voltage as applied to the diode to drop off in the negative direction only after the storage time T has been allowed to elapse. This drop, however, does not appear suddenly, but gradually (fall time). The amplitude of this negative drop is limited by the leading edge of the next successively following input pulse whose amplitude depends upon the difference of time between the trailing edge and the leading edge of the pulses of the applied train of pulses less (or reduced by) the diode storage time. When the time $T_0$ between pulses is less than the storage delay time, no negative pulses appear across the diode and this effect determines the maximum frequency which the discriminator will respond to. As the frequency decreases from $f_{max}$, the pulse interval increases and the amplitude of the pulses appearing across the diode increases. This effect continues until the maximum possible amplitude which is determined by the bias voltage applied to resistor 4, is reached. A further decrease in frequency does not affect the amplitude of the pulses across the diode and this determines the minimum frequency $f_{min}$ which the discriminator will respond to. The output pulses appearing across diode 3 as shown in FIG. 2*b* are rectified by diode 5 and filtered by resistor 6 and capacitor 7 to yield an output DC voltage which increases almost linearly with the frequency between $f_{min}$ and $f_{max}$—hence within the operating range of the discriminator.

FIG. 2*c* shows the discriminator characteristic of such a circuit arrangement. In this figure $U_D$ is the discriminator output voltage and $f$ is the frequency. The operating range of the discriminator lies between the frequencies $f_{min}$ and $f_{max}$. Outside said operating range $U_D$ is either zero or equal to $U_{Dmax}$.

A second example according to the invention uses transistors instead of diodes. A circuit arrangement is illustrated in FIG. 3. This arrangement yields a discriminator which is more efficient and which furthermore has a low output impedance. The voltage signal source 1, in this example, furnishes a pulse voltage alternating between zero and a negative value. 2 represents a resistor. 8 is the transistor whose storage time delay T is made use of according to the invention and 9 is the collector resistor of said transistor. When the leading edge of a pulse is applied to the base of transistor 8 current immediately flows and a voltage drop occurs at the collector of said transistor. The trailing edge of the input pulse, however, when applied to the base, does not cause the collector voltage to rise instantly to a new value. Instead of this, the voltage now as before remains almost at zero during the storage time T. Only after the storage delay time has been allowed to elapse, this voltage, within the so-called "fall time," increases to assume positive values. In case the time $T_0$ between the successively following pulses is shorter than the storage delay time T, the collector voltage of transistor 8 continuously assumes a value of almost 0 volt. If, however, the time $T_0$ is somewhat longer than the storage delay time T, then pulses will appear at the collector of transistor 8, whose amplitude being in proportion to the difference of time between $T_0$ and T. This relationship is applicable up to a maximum value of $T_0$ appearing at a frequency $f_{min}$. Theoretically a signal such as illustrated in FIG. 4*b* is present at the collector of transistor 8. Actually, its shape is quite different as is pointed out hereinafter.

Referring again to FIG. 3, the pulses appearing at the collector of transistor 8 are applied via a diode 12 to a transistorized detector which consists of transistor 11, resistor 13 and capacitor 14. The DC output of this detector is taken from the emitter of transistor 11 and is of a magnitude approximately equal to the peak voltage of the pulses applied to the base of transistor 11. Diode 12 is only required if the battery voltage $U_b$ is higher than the permissible blocking voltage between the base and emitter of transistor 11. This circuit, by use of a feedback scheme tunes itself to approximately the center frequency of the input signal. This self-tuning feature is achieved with resistors 2, 10, 15, and capacitor 16.

The following describes the feedback operation of this circuit. When the bias voltage across capacitor 16 decreases, the storage time of transistor 8 decreases and the amplitude of the pulses appearing across the collector of transistor 9 increases. This increase causes the detector output level to increase thus causing the voltage across capacitor 16 to increase. An additional feature of this circuit is that because of the feedback above described, it is insensitive to temperature variations.

Figure 5A:
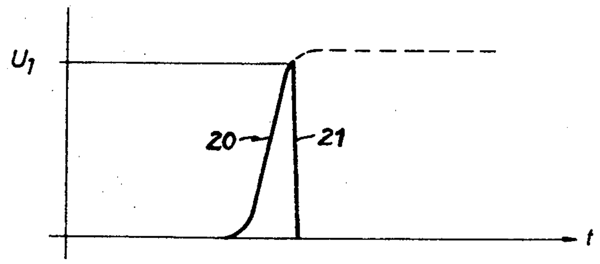
Figure 5B:
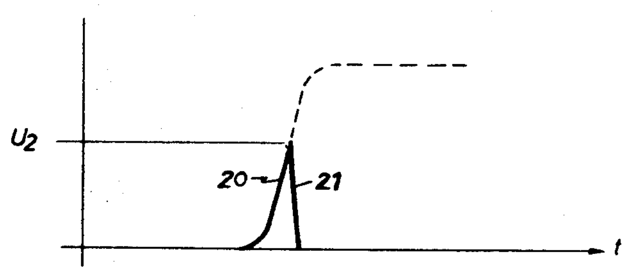
Figure 5C:
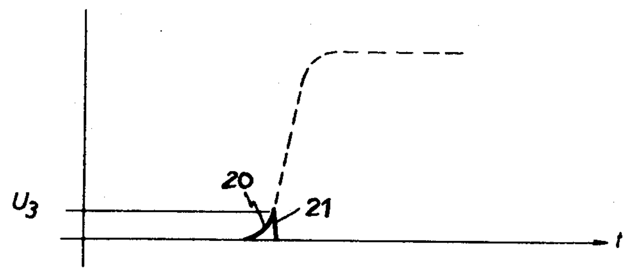

FIGS. 5*a* to 5*c* illustrate actual pulses at the collector of transistor 8. The edge 20 is analogous to the edge 17 in FIG. 4*b* namely the delay switch off edge. 21 represents the switch on edge. FIG. 6 illustrates the pulses at the collector of transistor 8 at the frequency $F_1$. This frequency is slightly higher than the minimum frequency $f_{min.}$ (see FIG. 6). A DC voltage $U_1$ is obtained by rectifying the pulses shown in FIG. 5*a*. At the higher frequency $f_2$ the interval between the delayed switch off edge 20 and the following switch on edge 21 is less so that, as illustrated in FIG. 5*b*, a voltage $U_2$ is obtained at the frequency $f_2$. FIG. 5*c* shows the pulse curve for the frequency $f_3$ at which the DC voltage $U_3$ is obtained. As may be gathered from 5*a*, *b*, *c* and from FIG. 6 the shape of the discriminator edge 19 which is a function of the frequency, is identical with the switch off edge 20, which is a function of time. According to the invention the storage delay time T which is dependent upon the amplitude of the input signal 1, upon the resistance value of the resistors 2 and 10, upon the magnitude of the voltage at the capacitor 16, and upon the semiconductor properties of transistor 8, is selected thus that the time $T_0$ between two successively following pulses at the predetermined frequency $f_{max.}$ is equal to the storage delay time T. In such a case the commencement of the delayed switch off edge 20 and the commencement of the switch on edge 21 coincides so that the output voltage of the discriminator is zero. The steepness of the delayed edge 20 is so high according to the present invention that at the predetermined frequency $f_{min.}$ the full amplitude of the delay pulse is achieved. At the frequency $f_{min.}$ the switch on edge 21 commences only when the blocking or nonconductive delay edge 20 has reached its maximum possible value.

The slope of the delayed nonconductive edge 20 can be varied. A reduction of this inclination is possible by increasing the capacity between the collector of transistor 8 and ground. A further reduction of the inclination can be achieved by reducing the collector resistance 9. An amplifying stage may also be provided between the collector of transistor 8 and the rectifier 11 if an extremely steep edge is desired. The amplifying stage advances only the steep zone of the nonconductive delay edge.

It is to be understood that the foregoing description of specific examples of this invention is made by way of example only and is not to be considered as a limitation on its scope.

I claim:

1. A pulse frequency discriminator comprising:
a semiconductor element,
biasing means coupled to said semiconductor element for creating a specific storage delay time such that the leading edge of each input pulse occurs during the sloped portion of the characteristic curve of the discriminator; and
means for applying to said semiconductor element a pulse wave whose voltage alternates between a turn-on level and a cut-off level for said semiconductor element for producing output pulses of an amplitude which changes linearly with frequency within the operating range of the discriminator.

2. A circuit according to claim 1 wherein said semiconductor is a diode.

3. A circuit according to claim 2 further including means coupled to said semiconductor element for converting the output pulses into a DC voltage whose amplitude changes linearly with the frequency within the operating range of the discriminator.

4. A circuit according to claim 1 wherein said semiconductor element is a transistor, further including means coupled to said semiconductor element for converting the output pulses into a DC voltage whose amplitude changes linearly with the frequency within the operating range of the discriminator.

5. A circuit according to claim 4 further including means for feeding back said DC voltage to automatically control the center frequency of the frequency discriminator.

References Cited

UNITED STATES PATENTS

| | | | |
|---|---|---|---|
| 2,905,815 | 9/1959 | Goodrich | 307—280 X |
| 2,976,429 | 3/1961 | Abbott et al. | 307—281 |
| 3,098,936 | 7/1963 | Isabeau | 307—280 X |
| 3,356,861 | 12/1967 | Heber | 307—319 X |
| 3,391,286 | 7/1968 | Lo Casale et al. | 307—319 X |

ALFRED L. BRODY, Primary Examiner

U.S. Cl. X.R.

307—233, 281, 300, 319; 325—441, 451; 329—104, 205